United States Patent [19]

White

[11] 4,137,924
[45] Feb. 6, 1979

[54] APPARATUS FOR SEPARATING VEGETABLES FROM THEIR SHELLS

[76] Inventor: Burlen B. White, 114 Hemlock, Lufkin, Tex. 75901

[21] Appl. No.: 767,800

[22] Filed: Feb. 11, 1977

[51] Int. Cl.² .............................................. B02B 3/08
[52] U.S. Cl. ................................................ 130/30 H
[58] Field of Search ................ 130/5 R, 30 R, 30 G, 130/30 H

[56] References Cited

U.S. PATENT DOCUMENTS

| | | | |
|---|---|---|---|
| 1,263,130 | 4/1918 | Scott | 130/30 H |
| 1,340,607 | 5/1920 | Hamachek | 130/30 H |
| 2,633,852 | 4/1953 | Lupton | 130/30 H |
| 4,052,992 | 10/1977 | Taylor | 130/30 H |

FOREIGN PATENT DOCUMENTS 16881 of 1889 United Kingdom ................ 130/30 H

*Primary Examiner*—Russell R. Kinsey
*Assistant Examiner*—Daniel J. Leach
*Attorney, Agent, or Firm*—Arnold, White & Durkee

[57] ABSTRACT

Apparatus for separating vegetables from their shells is characterized by a cylindrical basket element defining a volume in which raw, unshelled vegetables are received. Disposed within the basket is a plurality of arcuate segments. The leading edge of each segment projects radially inwardly into the radially outer regions of the basket volume to define a gap between the edge of the segment and the basket element. Vegetables to be shelled are introduced into the basket volume and agitated to cause the vegetables to be ejected from their shells. The vegetables and the empty shells collect toward the radially outer regions of the basket volume. A strainer element is disposed in the gap between the leading edges of each of the arcuate segments and the basket. The strainer is sized to permit only shelled vegetables to pass therethrough. Rotation of the basket volume in a predetermined angular direction moves the strainer elements through the collected vegetables and empty shelled to permit only the vegetables to pass circumferentially from the interior of the basket, while retaining the shelled therewithin.

16 Claims, 5 Drawing Figures

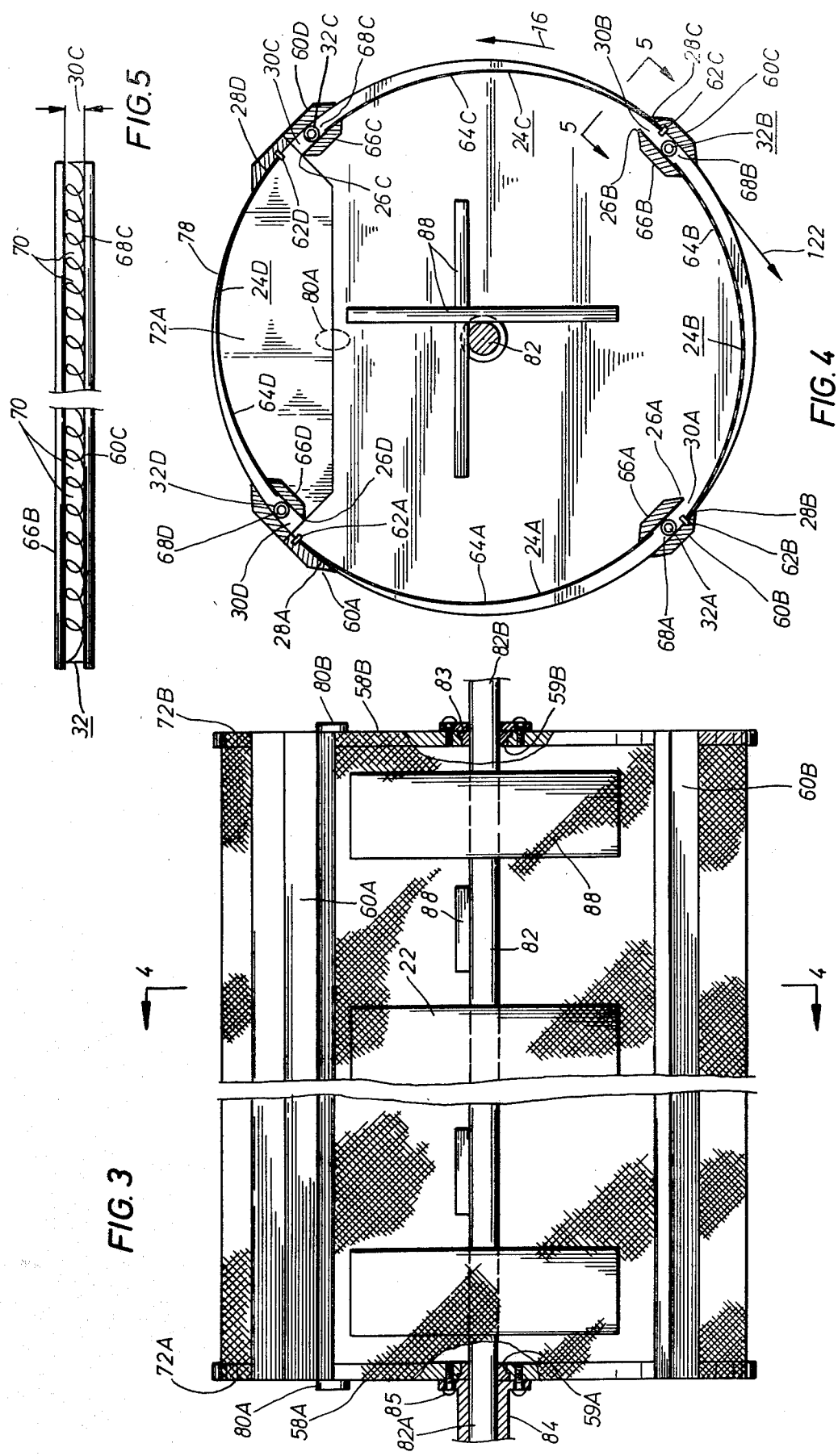

4,137,924

APPARATUS FOR SEPARATING VEGETABLES FROM THEIR SHELLS

BACKGROUND OF THE INVENTION

1. Field of the Invention

This invention relates to vegetable shelling apparatus and, in particular, to a vegetable shelling apparatus wherein the separated vegetables pass outwardly from a basket volume in a circumferential direction.

2. Description of the Prior Art

Vegetables, such as peas or beans, when harvested, are encased within a typically dry or membranous outer protective covering known generally as the shell. In order to further process the vegetables it is necessary to separate the vegetable from its protective shell. However, care must be exercised to avoid damage to the vegetables during the husking, or shelling, operation.

Of course, vegetables may be manually shelled, but such a process is burdensome, time-consuming and expensive. Therefore, the prior art provides several vegetable shelling devices, these devices being generally groupable into two main classes.

The first class of shelling apparatus provides an enclosed mesh or otherwise perforated basket, usually cylindrical in shape, into which the vegetables to be shelled are introduced. A suitable agitator is provided within the volume of the basket to break the shells and eject the vegetables therefrom. The openings in the mesh or perforations of the basket are usually sized to permit the shelled vegetables to pass therethrough, while the spent, empty shells are retained within the basket volume. The shelled vegetables pass radially outwardly (relative to the axis of the cylindrical basket volume) and may be collected in a tray, basket, or other receptacle disposed beneath the basket. Although the basket is usually rotated in a predetermined angular direction (no specified direction being optimum), in theory, the only movement required is the agitation of the husked vegetables, for once the shells are broken, the vegetables fall by their own weight through the openings in the perforated basket. Exemplary of such prior art devices are U.S. Pat. Nos. 496,206 issued to Placide, 421,244 issued to Chisholm et al., and 457,538 issued to Moulton.

A variation on the basic theme is provided in U.S. Pat. No. 3,825,018, to Ferrars, which provides means for radially clearing the openings in the mesh or perforated basket to prevent the unwanted accumulation of spent shells from blocking the egress passages for the shelled vegetables. In the same vein is U.S. Pat. No. 3,041,486 issued to Farmer, Sr., which extends needle-like elements through the mesh or perforations to keep them clear and open. U.S. Pat. No. 3,087,499 issued to Carmichael, Jr., et al., describes a resilient mesh basket structure. U.S. Pat. No. 3,084,696, issued to Carmichael, Jr., relates to an agitator operatively connected to the basket which acts to prevent clogging of the mesh or perforated openings.

A second class of prior art shelling apparatus is that exemplified by U.S. Pat. No. 3,238,950 issued to Taylor. This type of apparatus utilizes closely spaced, stacked roller elements which cause the vegetables to be ejected from their shells by the compression of the shells between the rollers. Such operation is analagous to the wringer operation commonly used on now-outdated washing machine apparatus. One disadvantage of the structure exemplified by the last-mentioned patent occurs due to the requirement that the vegetables be oriented so that the shells enter the rollers substantially perpendicular to their axes of rotation. It is also apparent that a portion of the vegetables being shelled may be squashed or otherwise destroyed with apparatus of the second general classification.

In view of the foregoing, it is advantageous to provide a vegetable shelling apparatus wherein the vegetables to be husked, or shelled, are inserted or deposited within a volume within a basket member such that agitation thereof causes the vegetables and the spent shells to collect in the radially outer regions of the interior of the basket. It is also of advantage to move strainer elements through the collected vegetables and their shells so that the vegetables pass circumferencially through the strainers and out of the basket while the shells are retained therein. Further advantage may be provided by the disposition of the strainer elements in radial gaps between the basket itself and the leading edges of arcuate segments projecting into the basket region. Still further advantage may be provided by rotation of the basket and the agitator at predetermined speeds, so as to maximize the ejection and separating of the vegetables from their shells.

SUMMARY OF THE INVENTION this invention relates to an apparatus for separating vegetables from their shells. The apparatus generally comprises a basket element defining a volume into which vegetables to be separated from their shells are introduced. Means for rotating the basket in a predetermined angular direction are connected thereto. Suitable agitators, such as paddles or the like, for agitating the unhusked vegetables and causing them to be ejected from their shells are disposed centrally and axially through the basket volume. Rotation of the agitators and the basket each in the same predetermined angular direction and each at predetermined rotational speeds separates the vegetables from their shells. The action of the agitator in cooperative association with the rotation of the basket causes the shelled vegetables and the empty shells to collect toward the radially outer regions of the basket volume.

The basket is provided with a plurality of substantially arcuate segments. The leading and trailing edges of the arcuate segments are defined with respect to the predetermined angular direction of rotation of the basket. The leading edge of each arcuate segment is arched radially inwardly and projects into the interior of the basket volume. A strainer element is disposed in the radial gaps defined between the leading edge of the segments and the basket. Rotation of the basket moves the strainers through the collected vegetables and shells to permit the vegetables to pass circumferentially, or tangentially, through the strainer elements and out of the interior of the basket volume. Suitable collection receptacles may be provided.

BRIEF DESCRIPTION OF THE DRAWINGS

The invention will be more fully understood from a following detailed description of the preferred embodiment thereof, taken in connection with the accompanying drawings, which drawings form a part of this specification, in which:

FIG. 3 is an elevational view, in section, of the basket portion of a vegetable separating apparatus embodying the teachings of this invention;

FIG. 4 is a sectional view taken along section lines 4—4 of FIG. 3; and,

FIG. 5 is a view taken along lines 5—5 of FIG. 4 illustrating the disposition of a strainer element in a separating apparatus embodying the teachings of the invention.

DESCRIPTION OF THE PREFERRED EMBODIMENT

Figure 1:
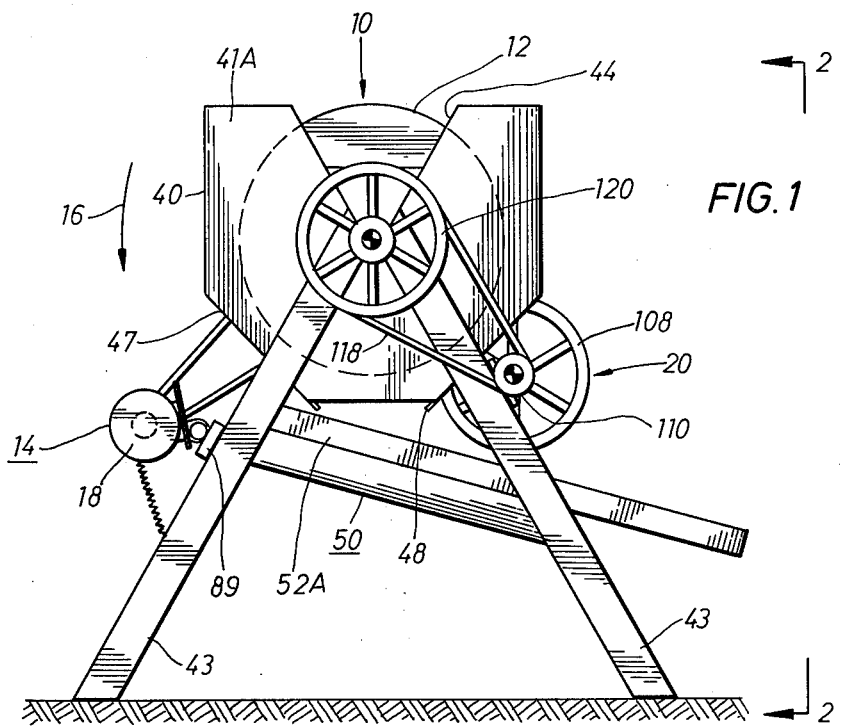
FIG. 1 is a side elevational view of a vegetable separating apparatus embodying the teachings of this invention.

Throughout the following description similar reference numerals refer to similar elements in all figures of the drawings.

Figure 2:
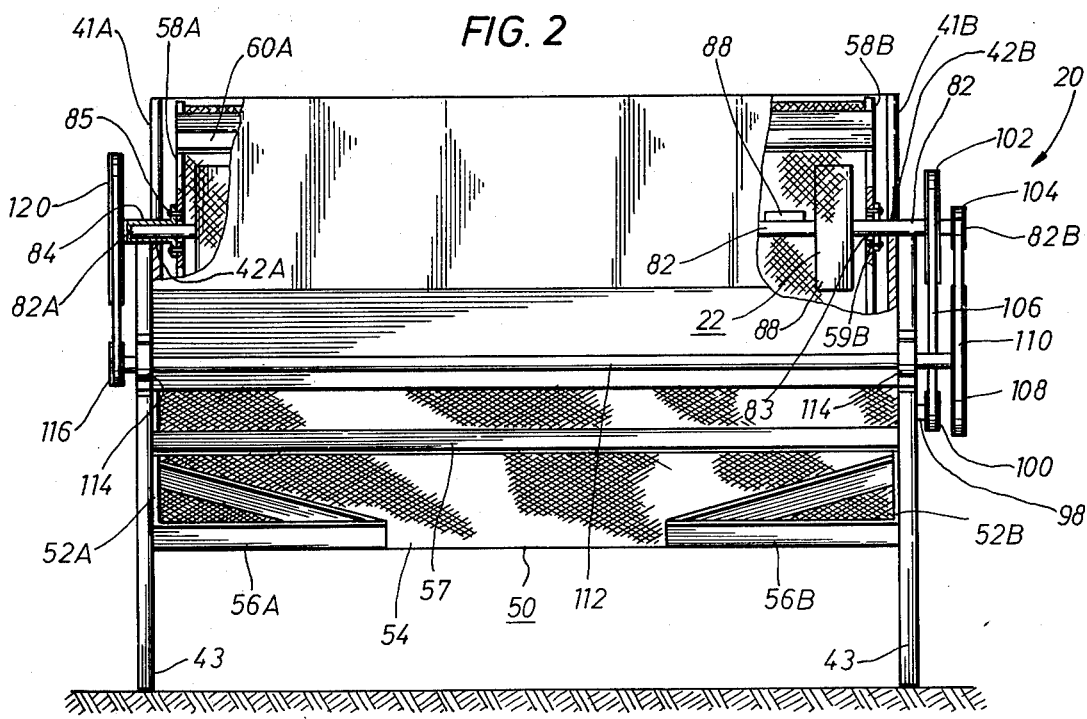
FIG. 2 is a front elevational view of an apparatus embodying the teachings of this invention, taken substantially along lines 2—2 of FIG. 1, having portions broken away and in section, for clarity.

Referring to FIGS. 1 and 2, respectively shown are side elevational and front elevational views of apparatus 10 for separating vegetables from their shells embodying the teachings of this invention. FIG. 2 has portions of the apparatus 10 broken away for ease of description of the illustrated elements and for clarity of understanding of the operation of the invention.

Generally, the apparatus 10 for separating harvested vegetables from their shells comprises a basket element generally indicated by reference numeral 12 which defines a volume therein for receiving the unshelled vegetables. Means generally indicated by reference numeral 14 are provided for rotating the basket 12 in a predetermined angular direction indicated by reference arrow 16. Speaking more specifically, the rotating means 14 include an electric motor 18 connected by a belt and gear arrangement 20 in a manner to be more fully described herein. Disposed centrally and axially through the interior of the basket element 12 is agitator means generally indicated by numeral 22 for agitating the unshelled vegetables disposed within the volume of the basket 12 and for causing the vegetables to be ejected from their shells. The agitator means 22 is connected through the belt and gear arrangement 20 to the motor 18, which thereby provides means for rotating the agitators within the basket 12. As is made more clear herein, the belt and gear arrangement 20 is connected so as to cause rotation of the basket 12 at an angular speed different from the speed of rotation of the agitator means 22. Of course, any suitable agitator means 22 may be utilized in connection with the separating apparatus embodying the teachings of this invention.

Referring to FIGS. 3 and 4, which are, respectively, front and side elevational views, both in section, of the basket element 12, the vegetable separating apparatus 10 further comprises at least one segment 24 (FIG. 4) having a leading edge 26 and a trailing edge 28, the leading and trailing edges being defined with respect to the predetermined angular direction of rotation 16. The leading edge 26 of the segment 24 is arched and projects inwardly into the volume defined by the basket 12 to define a substantially radial gap 30 therebetween. A strainer element 32 sized to permit vegetables to pass therethrough is disposed within the gap 30.

As seen in FIGS. 1 and 2, the basket 12 is supported within a substantially rectangular frame 40. The frame 40 includes sidewalls 41A and 41B, each having an opening 42A and 42B, respectively, provided therein for a purpose more fully explained herein. The frame 40 is supported on suitable struts or legs 43. The frame 40 is open at the top 44 thereof to expose and permit access to be had into the basket 12. The lower portion of the frame 40 tapers as at 47 toward a narrow, more restricted opening 48. As is made more clear herein, the tapered, sloped lower portion 47 tends to channelize shelled vegetables separated from there shells or husks by the operation of the apparatus 10 toward the opening 48 to thereby conduct the separated vegetables to means, generally indicated by reference numeral 50, for collecting the vegetables. The means 50 may conveniently include a tray defined by sidewalls 52A and 52B attached between the struts 43 and having a mesh fabric 54 connected therebetween. Triangular channel guide members 56A and 56B are provided as illustrated to channelize the flow of separated vegetables from the tray 50 into any suitable collecting receptacle disposed therebeneath (not shown). Also connected between the struts 43 is a transverse supporting member 57 which acts to secure the mesh 54 and also cooperates with the sidewalls 52A-B to impart structural integrity to the framework 40. Of course, any suitable framework and tray arrangement may be used and remain with the scope of the invention.

The basket 12 is, as mentioned above, a substantially cylindrical element formed by the connection of first and second circular end plates 58A and 58B, each with openings 59A and 59B, respectively, therein, connected together by a plurality of longitudinally extending slats 60A through 60D (FIGS. 3 and 4). Attached to the radially inward side of each of the slats 60 are the trailing edges 28A-D of each of the arcuate segments 24A-D disposed within the basket 12. Any suitable means, such as pins 62A-D, may be used to secure the trailing edges 28A-D of the segments 24A-D in the described assembled relationship to the radially inward side of the slats 60A-D. The arcuate segments 24A-D may be formed of a semi-rigid wire screen or mesh fabric indicated diagramatically by reference numeral 64A-D. A reinforcing slat 66 is provided adjacent the first or leading edge 26 of each of the arcuate segments 24A-D.

As may be appreciated from FIG. 4, the slat 66 located at the first or leading edge 26 of each of the segments 24A-D is spaced radially inwardly with respect to the basket volume 12 and extends into the outer radial regions thereof. The gap 30 is seen as being defined between the outer surface of the slat 66 and the inner surface of the slat 60. As seen in relation to FIG. 5, the strainer elements 32A-D disposed in the radial gap 30 between the slats 60A-D and 66A-D conveniently includes a stretched helical coil spring 68. Spring 68 defines channels or spaces 70 between adjacent coils thereof. The spaces 70 are of a size sufficient to permit husked, or shelled, vegetables to pass therethrough and out of the basket volume while maintaining the empty shells of the vegetables within the basket volume 12.

The slats 60A and 60D are split, as shown in FIG. 4, and each cooperates with a segment 72 cut from each of the end plates 58 to define a removable, substantially arcuate lid or cover 78. Removal of the cover 78 permits access to the interior of the basket volume 12 (through the open top 44 of the frame 40). The end segments 72 of the cover 78 are conveniently attached by removable locks 80 to their respective end plates 58.

Extending centrally and axially through the interior of the basket volume 12 is the agitator means 22. Any suitable agitator means 22 may be utilized and remain within the teachings of this invention, but a preferred embodiment thereof includes a substantially axially extending shaft 82 passing through the center of the volume of the basket 12 and extending through openings 59 defined in each of the end plates 58. As best seen in FIGS. 2 and 3, the end 82B of the shaft 82 is supported by an annular bushing 83 disposed about the opening 59B in the end plate 58B. The opposite end 82A of the shaft 82 passes freely through the opening 59A provided in the end plate 58A. The end 82A of the shaft 82 is received within a flanged bushing 84 and is freely rotatable relative thereto. The flanged bushing is, as seen in FIGS. 2 and 3, secured to the end plate 58A about the periphery of the opening 59A therein by suitable means, such as threaded pins 85. As seen in FIG. 2, the end 82B of the shaft 82 passes through the opening 42B in the sidewall 41B, while the elongated shaft portion of the flanged bushing 84 passes through the opening 42A in the sidewall 41A. Suitable bearing surfaces 81 in the openings 42 are provided. Mounted in any suitable orientation on the shaft 82 is a plurality of mutually perpendicularly disposed agitators, or paddles 88.

The drive means 14 for rotating the basket 12 and, in the particular embodiment shown in the Figures, for also rotating the agitating means 22, includes an electrical motor 18 mounted to a support strut 89. The motor 18 is connected through the pulley and belt arrangement 20 in a driving relationship with the basket 12 and the agitating means 22 and, through the operation of the pulley and belt arrangement, drives the basket 12 and the agitating means 22 in the same angular direction 16, but at different speeds of rotation.

In the embodiment of the invention shown in the Figures, the shaft 98 of the electrical motor 18 is directly connected to a first pulley 100. Pulleys 102 and 104, each of a predetermined diameter, are mounted at the end 82B of the shaft 82. The pulleys 102 and 104 are directly connected to the motor 18 by a belt 106 to thereby provide motive force for the rotation of the paddles 88 in the predetermined angular direction 16.

The pulley 104 is connected to pulley 108 by a belt 110 to thus indirectly drive a rotatable shaft 112 freely mounted for rotation in brackets 114 disposed on the struts 43. The opposite end of the shaft 112 has a pulley 116 thereon, which is connected by a belt 118 to a pulley 120. The pulley 120 is fixed to the shaft portion of the flanged bushing 84. The bushing 85 is connected through the pins 85 to the basket 12. The basket 12 is thus indirectly driven by the motor 18 in the angular direction 16, but at a second rotational speed, through the arrangement of the pulleys 104, 108, 116, and 120, the belts 110 and 118, and the shaft 112. The rotational speed of the basket 12 and the paddles 88 is thus related to the size of the pulleys and the rotational speeds of the basket and paddles may be made equal or varied relative to the other in any manner as appreciated by those skilled in the art. As understood from the drawings, the end 82A of the shaft 82 rotates freely within the flanged bushing 84 as the bushing is directly connected at its flanges in a driving relationship to the basket 12.

It is understood that it is within the contemplation of this invention to rotate the paddles 88 comprising the agitating means 22 in the same or the opposite direction as the direction of rotating the basket 12, and at an angular speed equal to or different from the speed at which the basket 12 is rotated. Any convenient method of driving the agitating means 22 from the same prime mover 18 that is used to rotate the basket 12 may be utilized and remain within the teachings of this invention.

OPERATION

Having thus defined the structural elements of a vegetable separating apparatus embodying the teachings of this invention, the operation thereof will now be discussed.

Upon removal of the cover segments 78 raw, freshly harvested vegetables still within their shells may be introduced within the volume defined on the interior of the basket 12. After the cover 78 is replaced and suitably and securely reaffixed, the agitating means 22 and the drive motor 18 for the basket 12 are actuated. The action of the agitating means 22 breaks the shells and separates the vegetables therefrom. The cooperative action of the agitators or paddles 88 and the rotation of the basket 12 result in the separated vegetables and shells being directed toward the radially outer regions of the interior of the basket 12.

Rotation of the basket 12 simultaneously moves the strainer elements 32 disposed in the radial gap 30 between the leading edges of the segment 24 and the basket 12 through the separated vegetables and shells collecting toward the outer radial regions of the basket 12. The vegetables pass tangentially or circumferentially outwardly from the interior of the basket volume 12 through the spaces 70 (FIG. 5) defined in the strainer element 32 and fall through the open end 48 of the frame 40 into the tray 50 disposed therebeneath. The shells are of sufficient size to be retained within the basket volume 12.

It may thus be appreciated that a vegetable separating apparatus embodying the teachings of this invention efficiently separates vegetables from their shells and permits the shells vegetables tangentially or circumferentially out of a basket element being rotated in a predetermined angular direction.

While a particular embodiment of the invention has been shown and described, it will be understood that the invention is not limited thereto, since many modifications may be made by those skilled in the art without departing from the contemplation of this invention.

What is claimed is:

1. Apparatus for separating vegetables from their shells comprising:
    a basket defining a volume therein for receiving unshelled vegetables;
    means for rotating said basket in an angular direction;
    agitator means for agitating the unshelled vegetables and causing them to be ejected from their shells, a portion of the ejected vegetable and the emtpy shells collecting toward the outer regions of said basket volume;
    a wall of said basket including at least one segment having a leading and a trailing edge defined in accordance with the direction of rotation of the basket, said leading edge projecting inwardly into said basket volume to define a gap extending between said leading edge and said basket wall; and
    a strainer sized to pass unshelled vegetables therethrough disposed within said gap;
    rotation of said basket in said angular direction moving said strainer element through the collected empty shells and vegetables, said strainer passing the vegetables circumferentially out of said basket volume and retaining the shells therewithin.

2. Apparatus according to claim 1 further comprising means disposed beneath said basket volume for collecting vegetables passing circumferentially outwardly through said gap.

3. Apparatus according to claim 1 wherein said agitator means is disposed centrially and axially within said basket and wherein said agitator means rotates in said angular direction.

4. Apparatus according to claim 3 wherein movement of said agitator in said angular direction and movement of said basket in said angular direction cooperate to collect ejected vegetables and shells adjacent the radially outer regions of said basket volume.

5. Apparatus according to claim 1 further comprising:
a plurality of segments disposed within said basket, said at least one segment being included within said plurality, each segment having leading and trailing edges thereon defined in accordance with the direction of rotation of said basket, the leading edge of each of said segments projecting radially inwardly into said basket volume to define a radial gap extending between each leading edge of each basket and said basket; and,
a corresponding plurality of strainer elements, said strainer being included in said plurality of strainer elements, one of said plurality of strainer elements being disposed in each of said radial gaps between said leading edge of segments and said basket.

6. Apparatus according to claim 5 wherein said segments are equiangularly disposed about the interior of said basket.

7. Apparatus according to claim 1 wherein said basket is cylindrical and has a removable cover portion disposed thereon. Removal of said removable cover portion permitting introduction of unshelled vegetables into said basket volume.

8. Apparatus according to claim 7 wherein said basket includes first and second end plates, a plurality of longitudinally extending slates disposed between said end plates, the leading edge of said segment being disposed radially inwardly of one of said longitudinally extending slats.

9. Apparatus according to claim 1 wherein said strainer element comprises a coil spring.

10. Apparatus according to claim 8, wherein said strainer element comprises a coil spring, the spaces between adjacent coils being sized to pass separated vegetables but to prevent passage of shells.

11. Apparatus for isolating vegetables from their shells comprising:

a cylindrical basket element defining therewithin a volume for receiving unshelled vegetables;
means for rotating said basket element in a first angular direction;
agitator means including a plurality of paddle elements disposed centrally and axially through said basket element for agitating the unshelled vegetables and ejecting them from their shells;
means for rotating said paddle elements in said first angular direction, a portion of the ejected vegetables and their shells responding to the action of the paddles and the basket and collecting toward the outer regions of said basket volume;
the wall of said basket including a plurality of segments, each segment having a leading and a trailing edge defined in accordance with said direction of rotation of said basket;
said leading edge of each of said segments projecting radially inwardly into the basket volume to define a radial gap between each of said leading edges and the basket wall;
a strainer sized to pass vegetables therethrough disposed within each of said radial gaps between said leading edges and said basket wall;
rotation of said basket in the first angular direction moving each of said strainer elements through the collected shells and vegetables, each of said strainer elements permitting vegetables to pass circumferentially outwardly from the basket therethrough and retaining the shells therein.

12. Apparatus according to claim 11 wherein said plurality of segments are equiangularly disposed about the interior of said basket.

13. Apparatus according to claim 12 wherein said basket comprises first and second circular end plates connected by a plurality of longitudinally extending slats, each of said leading edges of said segments being disposed radially inwardly of a slat, one of said strainer elements being disposed radially between each of said slats and one of said leading edges of said segments.

14. Apparatus according to the claim 13 wherein each strainer element comprises a coil spring, the spaces between adjacent coils being sized to pass separated vegetables but to prevent passage of shells.

15. Apparatus according to claim 12 further comprising means disposed beneath said basket for collecting vegetables passing circumferentially outwardly therefrom.

16. Apparatus according to claim 11, wherein said basket is rotatable at an angular speed different from the angular speed at which said agitator means is rotatable.

* * * * *